United States Patent [19]

Solomon et al.

[11] Patent Number: 5,646,712

[45] Date of Patent: Jul. 8, 1997

[54] METHOD AND APPARATUS FOR OPENING A CAMERA

[75] Inventors: Jeffrey Alan Solomon, Spencerport; Alan James Tubbs, Avon, both of N.Y.

[73] Assignee: Eastman Kodak Company, Rochester, N.Y.

[21] Appl. No.: 577,286

[22] Filed: Dec. 22, 1995

[51] Int. Cl.$^6$ ................................................ G03B 17/02
[52] U.S. Cl. .................. 396/535; 414/412; 396/514; 396/484
[58] Field of Search ................ 354/288, 275, 354/75, 76, 354; 414/411, 412

[56] References Cited

U.S. PATENT DOCUMENTS

| 3,579,801 | 5/1971 | Tall | 29/427 |
|---|---|---|---|
| 4,110,885 | 9/1978 | Fisher | 29/239 |
| 4,208,116 | 6/1980 | Morse | 354/275 |
| 4,248,564 | 2/1981 | Gentile et al. | 414/412 |
| 5,146,255 | 9/1992 | Nakai et al. | 354/288 |
| 5,285,229 | 2/1994 | Kamata | 354/288 |
| 5,348,239 | 9/1994 | Enomoto | 242/348.4 |
| 5,349,410 | 9/1994 | Kamata | 354/288 |
| 5,517,270 | 5/1996 | Balling | 354/288 |

FOREIGN PATENT DOCUMENTS

| 2-136254 | 11/1990 | Japan . |
|---|---|---|
| 4-65324 | 6/1992 | Japan . |
| 6-161053 | 6/1994 | Japan . |

*Primary Examiner*—A. A. Mathews
*Attorney, Agent, or Firm*—Charles E. Snee, III; David A. Howley

[57] ABSTRACT

Apparatus (90) is disclosed for opening a camera of a type including a front cover part (12) and a back cover part (14), each of the front cover part and the back cover part having a top wall (34, 42) and a bottom wall (36, 44) and first and second opposite end walls (38, 40; 46, 48); and a plurality of cooperating fastener pairs extending between the cover parts. There may be a first cooperating fastener pair (54, 60) extending between the top walls; a second cooperating fastener pair (56, 62) extending between the bottom walls; a third cooperating fastener pair (72, 74, 75) extending between the first end walls; and a fourth cooperating fastener pair (72, 74, 76) extending between the second end walls. The apparatus may include a frame (92–100); a fixture (110, 114–122) supported on the frame for securing the camera during opening; tool members (152, 154; 166, 168; 184, 186) for releasing the fastener pairs; and means (144, 146) for bringing the tool members into engagement with the fastener pairs to cause the fastener pairs to release, so that the front cover part and the back cover part can be separated. A corresponding method is taught.

20 Claims, 6 Drawing Sheets

2

METHOD AND APPARATUS FOR OPENING A CAMERA

DESCRIPTION

TECHNICAL FIELD

The invention concerns methods and apparatus for opening photographic cameras. More particularly, the invention is related to such methods and apparatus for opening an external housing of a single use camera.

BACKGROUND OF THE INVENTION

In recent years, so-called single use or disposable cameras have become popular. Such cameras include an internal frame for supporting conventional camera components, plus a film cartridge and a spool located on opposite sides of an exposure gate for the camera. Prior to use, the unexposed film is wound from the cartridge onto the spool. During use, each exposed frame is wound back into the cartridge. When all of the film has been exposed, the camera is taken to a photographic processor, where the camera housing is opened and the cartridge is removed. The remainder of the camera is then returned to the manufacturer for recovery of reusable components.

FIG. 1 shows an exploded view of a camera housing 10 used for some types of single use cameras. Housing 10 is disclosed in copending, commonly assigned U.S. application Ser. No. 08/327,250 filed Oct. 21, 1994 by James D. Boyd, the contents of which are incorporated by reference into this application. Housing 10 comprises a front cover part 12 and a back cover part 14 which in an assembled camera enclose an internal camera frame on which the functional components of the camera are mounted, not illustrated. Thus, cover pan 12 includes an opening 16 for a taking lens, an opening 18 for a viewfinder, an opening 20 for a flash unit, and an integral flash activation button 22. A more compact camera also is made without the flash unit and flash activation button. When the cover parts are assembled about the internal camera components, mating partial openings $24_f$ and $24_b$ cooperate to provide an opening for a shutter trigger button; and mating partial openings $26_f$ and $26_b$ cooperate to provide an opening for a window to view a frame counterwheel. In an assembled camera, a trio of positioning pins 28, 30, 32 extended from back cover part 14 mate with a corresponding set of bores, not illustrated, in front cover part 12.

As seen in FIG. 1, front cover part 12 includes a top wall 34, a bottom wall 36, a left end wall 38, and a fight end wall 40. Similarly, back cover part 14 includes a top wall 42, a bottom wall 44, a left end wall 46, and a fight end wall 48. In the illustrated camera housing, cooperating fastener pairs are included between the respective top, bottom and end walls, to securely join the front and back cover parts and thereby prevent inadvertent opening of the camera and exposure of film. However, those skilled in the art will appreciate that, for suitably rigid front and back cover parts, cooperating fastener pairs could be provided only between the respective end walls, which typically are opened by the photographic processor.

First and second cooperating fastener pairs extend, respectively, between top walls 34, 42 and bottom walls 36, 44. An essentially rectangular opening 50 is provided through top wall 42 and a similar opening 52 is provided through bottom wall 44. Flexible fastener hooks 54, 56 extend into openings 50, 52, respectively. In an outer surface of top wall 42, a recess 58 is formed behind fastener hook 54. An essentially identical recess, not illustrated, is formed in an outside surface of bottom wall 44 behind fastener hook 56. Opposite opening 50 and hook 54 and opposite opening 52 and hook 56, top wall 34 and bottom wall 36 support, respectively, a pair of flexible catch tabs 60, 62, the latter being fragmentarily visible through opening 16. Each of catch tabs 60, 62 includes an opening 64 for receiving one of hooks 54, 56 when the cover parts are assembled. Each of catch tabs 60, 62 also includes an outwardly extended lip 66 which fits into recess 58 when the cover parts are assembled. An elongated recess 68 is formed in each of top wall 34 and bottom wall 36 in front of opening 64. Alternatively, the fastener hooks could be on front cover part 12 and the catch tabs could be on rear cover part 14.

Third and fourth cooperating fastener pairs extend, respectively, between left end walls 38, 46 and right end walls 40, 48. Each of end walls 38, 40 includes a recess 70 in which a pair of vertically spaced catches 72, 74 are located. Opposite recesses 70, end walls 46, 48 support, respectively, a pair of flexible catch tabs 75, 76. Each of the catch tabs includes a pair of vertically spaced openings 77, 78 for receiving catches 72, 74 when the cover parts are assembled. Catch tabs 75, 76 also include respective tapered lips 80, 82 which extend into recesses 70 when the cover parts are assembled. Alternatively, the catches could be on back cover part 14 and the catch tabs could be on front cover part 12.

To assemble a camera using cover parts 12, 14, the internal components of the camera, not illustrated, are assembled and captured between front and back cover parts 12, 14. As the cover parts are brought together, positioning pins 28, 30, 32 enter the bores in cover part 12 to pilot the cover parts into proper mating engagement. As the pins enter their associated bores, fastener hooks 54, 56 flex to ride under catch tabs 60, 62 and eventually the hooks snap outward into engagement with openings 64. Preferably, fastener hooks 54, 56 then are ultrasonically or thermally welded to catch tabs 60, 62, to provide further assurance that the consumer will not be able to open the camera. Or the tips of the hooks may be omitted and the arms of the hooks welded to the catch tabs. In either event, the resultant, welded fastener pairs can be released by inserting a cuffing tool between recess 58 and lip 66 to cut the welded bond between the two, or by inserting a cutting tool along recess 68 to engage and cut the welded bond.

Essentially simultaneously with engagement of fastener hooks 54, 56 and catch tabs 60, 62, catch tabs 75, 76 flex to ride over catches 72, 74 and eventually the catch tabs snap inward over the catches. However, catch tabs 75, 76 and catches 72, 74 are left in mechanical engagement, rather than being welded, to facilitate their being opened by a photographic processor after all the film has been exposed. These fastener pairs can be opened by inserting a prying tool between lips 80, 82 and recess 70 to flex catch tabs 75, 76 out of engagement with catches 72, 74. Though this feature is not illustrated, the fight and left ends of back cover part 14 can then be pivoted away from the back of the camera about lines of weakness in a back wall of the back cover part, not illustrated, to permit removal of the enclosed film cartridge and a battery for the flash unit. Commonly, the processor will then re-engage the fastener pairs 72, 74; 75, 76 and return the camera to its manufacturer for removal of reusable internal components.

A need thus has developed for a simple, reliable method and apparatus for a manufacturer of such a camera to use to completely open the camera by removing the front and back cover pans to provide total access to the camera's internal components. Such method and apparatus could be used to open a used camera for removal of internal components or to open a new camera to repair defects discovered after initial assembly.

SUMMARY OF THE INVENTION

The primary objective of the invention is to provide a simple and reliable method and apparatus for opening a single use camera of the type described.

This objective is given only by way of illustrative example; thus other desirable objectives and advantages inherently achieved by the disclosed invention may occur or become apparent to those skilled in the art. Nonetheless, the scope of the invention is to be limited only by the appended claims.

The method of the invention is particularly suited for opening a camera of a type including a cover part and another part, each of the cover part and the other part having a top wall and a bottom wall and first and second opposite end walls; and a plurality of fastener pairs extending between the cover part and the other part. The plurality of fastener pairs may include a first cooperating fastener pair extending between the top walls; a second cooperating fastener pair extending between the bottom walls; a third cooperating fastener pair extending between the first end walls; and a fourth cooperating fastener pair extending between the second end walls. The method may include steps of securing the camera in a fixture; engaging the fastener pairs with a corresponding number of tools for releasing the fastener pairs; moving the tools to cause the fastener pairs to release; and separating the cover part and the other part from the camera.

At least a portion of the tools may be cutting chisels and the moving step may cause the chisels to cut open at least a portion of the fastener pairs. At least a portion of the tools may be prying tools and the moving step may cause the prying tools to prize open at least a portion of the fastener pairs. The cutting tools may engage the first and second fastener pairs and the prying tools may engage the third and fourth fastener pairs. Depending on the orientation of the fastener pairs, the tools may move from front to back or back to front of the camera. Or, a portion of the tools may move from front to back; and a portion of the tools may move from back to front of the camera. Preferably, the tools are moved simultaneously. The cover part may be a front cover part of the camera and the other part may be a back cover part of the camera, in which case a pair of the tools may be cutting chisels to cut open the first and second fastener pairs; and a pair of the tools may be prying tools to prize open the third and fourth fastener pairs.

The apparatus of the invention is particularly suited for opening a camera of the type previously described in this summary. As such, the apparatus may include a frame; a fixture supported on the frame for securing the camera during opening; tool means for releasing the fastener pairs; and means for bringing the tool means into engagement with the fastener pairs to cause the fastener pairs to release, whereby the cover part and the other part can be separated.

The tool means may include cutting chisels to cut open at least a portion of the fastener pairs and prying tools to prize open at least a portion of the fastener pairs. The cutting chisels may engage the first and second fastener pairs and the prying tools may engage the third and fourth fastener pairs. The tool means may move from front to back or from back to front of the camera. Or, a portion of the tools may move from front to back; and a portion of the tools may move from back to front of the camera. Preferably, the tool means are moved simultaneously. When the cover part is a front cover part of the camera and the other part is a back cover part of the camera, the tool means may include a pair of cutting chisels to cut open the first and second fastener pairs and a pair prying tools to prize open the third and fourth fastener pairs.

The frame may include a plurality of parallel guides; a first plate mounted for movement on the guides, the fixture being supported on the first plate; a second plate mounted on the guides, at least a portion of the tool means being mounted on the second plate; and the means for bringing into engagement may cause the first plate to move toward the portion of the tool means. The apparatus may further include a third plate mounted on the guides, at least a portion of the tool means being mounted on the third plate; and the means for bringing into engagement may cause the third plate to move toward the first and second plates. The second plate may be fixedly mounted on the guides. Resilient means may be included for biasing apart the first, second and third plates.

The invention provides various advantages. A camera is easily and safely loaded into and removed from the apparatus for opening. Both the welded and mechanical fastener pairs may be opened in a single operation. The fasteners are opened without significant risk of damage to internal components of the camera. The fasteners are opened without contacting internal components of the camera, such as a flash capacitor which might discharge. Since internal components are not damaged, a high rate of recycling is achieved with concomitant reduction is waste. The apparatus will open the top and bottom fastener pairs even if one or both of the end fastener pairs have been left open by a photographic processor. The apparatus and method can be used to facilitate repairs during initial assembly of a camera or to open a used camera for removal of reusable components.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
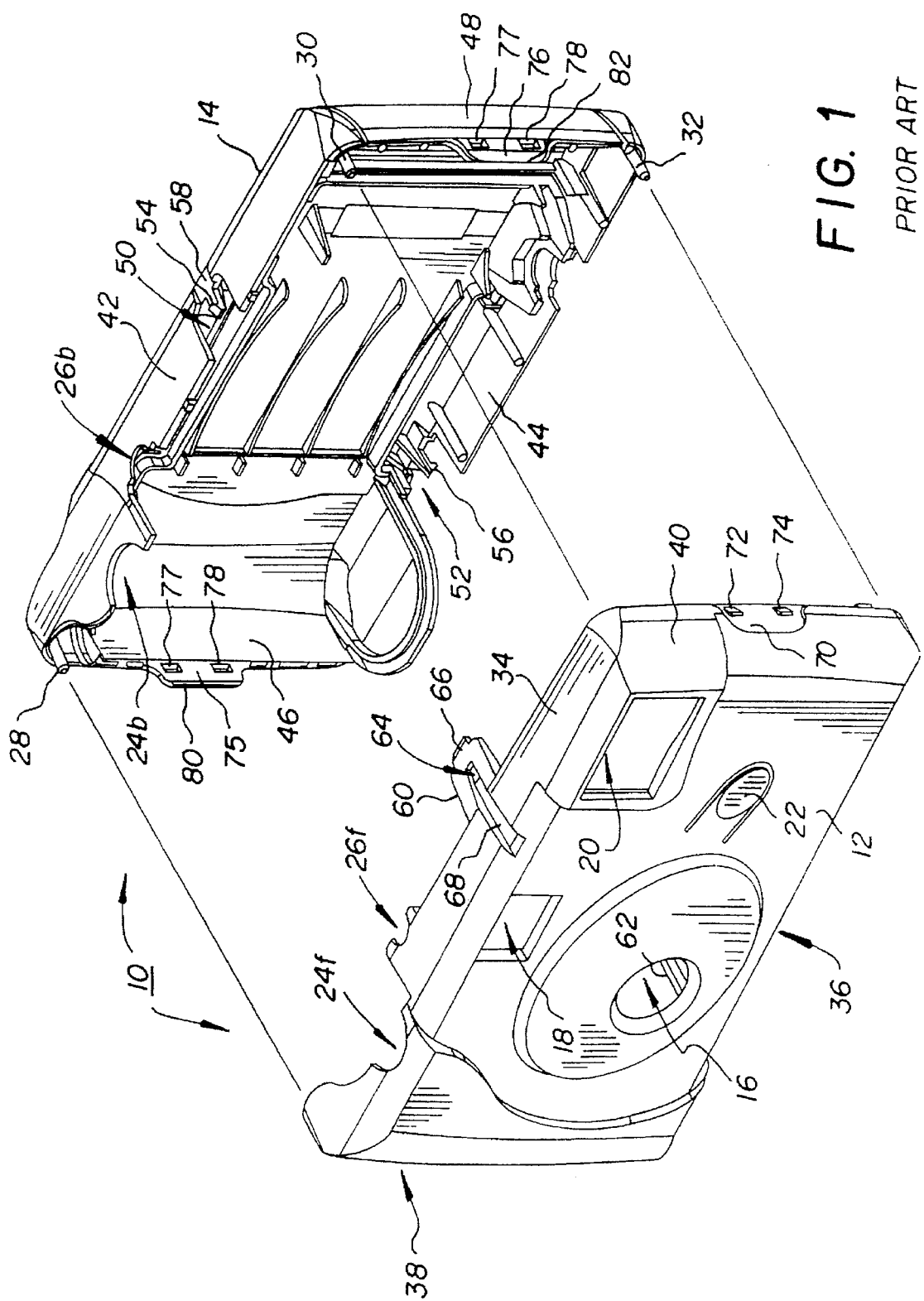
FIG. 1 shows an exploded perspective view of a prior art front cover part and back cover part of types used in cameras which can be opened in accordance with the invention.

The following is a detailed description of the preferred embodiments of the invention, reference being made to the drawings in which the same reference numerals identify the same elements of structure in each of the several Figures.

FIGS. 2 to 5 show one embodiment of an apparatus 90 in accordance with the invention. Four parallel guide rods 92, 94, 96, 98 are supported by and extended upward from a fixed base plate 100, to constitute a frame for the apparatus. Those skilled in the art will appreciate that fewer or more guide rods could be used. Mounted on the guide rods are respective coil springs 102, 104, 106, 108 which support a movable stripper plate 110 mounted by linear bearings 112 for movement along the guide rods. On an upper surface of stripper plate 110 are mounted a pair of camera support bars 114, 116 positioned to engage a front surface of front cover part 12 and hold the camera essentially horizontal. Positioned beside and behind the camera support bars are a set of camera alignment pins 117, 118, 120, 122 to engage the end and bottom walls of the camera and align the camera for opening. The camera support bars and alignment pins thus constitute a fixture for securing a camera during opening.

Mounted on the guide rods above stripper plate 110 are respective coil springs 124, 126, 128, 130 which support a movable stripper plate 132 mounted by linear bearings 134 for movement along the guide rods. Mounted on the guide rods above shipper plate 132 are respective coil springs 136, 138, 140, 142 which support a movable top plate 144 mounted by linear bearings 145 for movement along the guide rods. A linear actuator rod 146, such as a rod from a pneumatic actuator not illustrated, contacts top plate 144 to provide a means for bringing cutting and prying tools, to be described shortly, into engagement with the fastener pairs of a camera.

Figure 3:
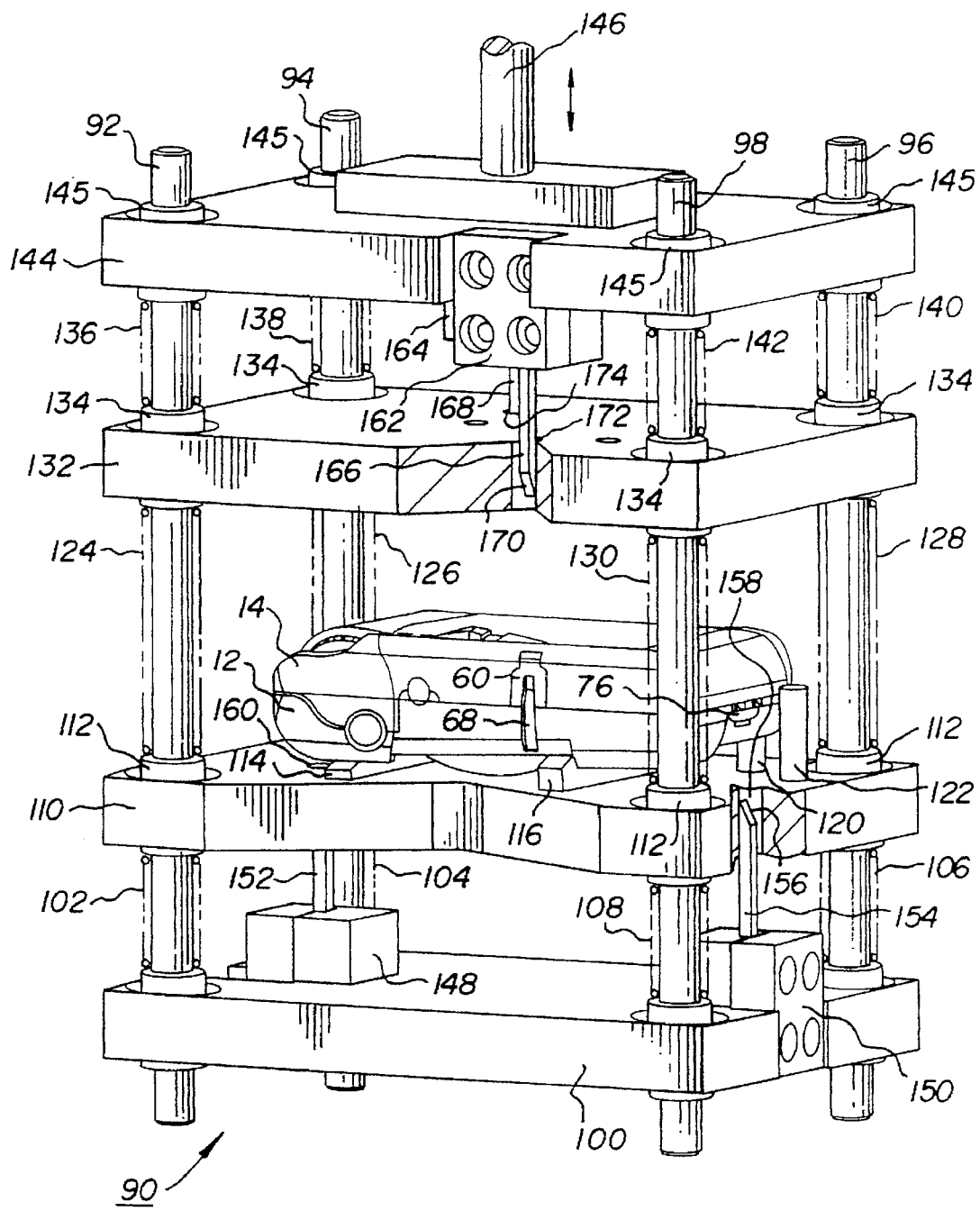
FIG. 3 shows the apparatus of FIG. 1 with a camera installed prior to opening.

Mounted near opposite ends of base plate 100 are tool support blocks 148, 150 on which are mounted upwardly extended prying tools 152, 154. As illustrated, the tools are provided with wedge shaped ends 156 configured for slipping between catch tabs 75, 76 and recesses 70, to pry the catch tabs out of engagement with catches 72, 74. Above tool 154, stripper plate 110 includes a bore 158 for passage of the tool into engagement with the camera. Similarly, as best seen in FIG. 3, a bore 160 is provided through snipper plate 110 above tool 152 for passage of the tool.

Figure 2:
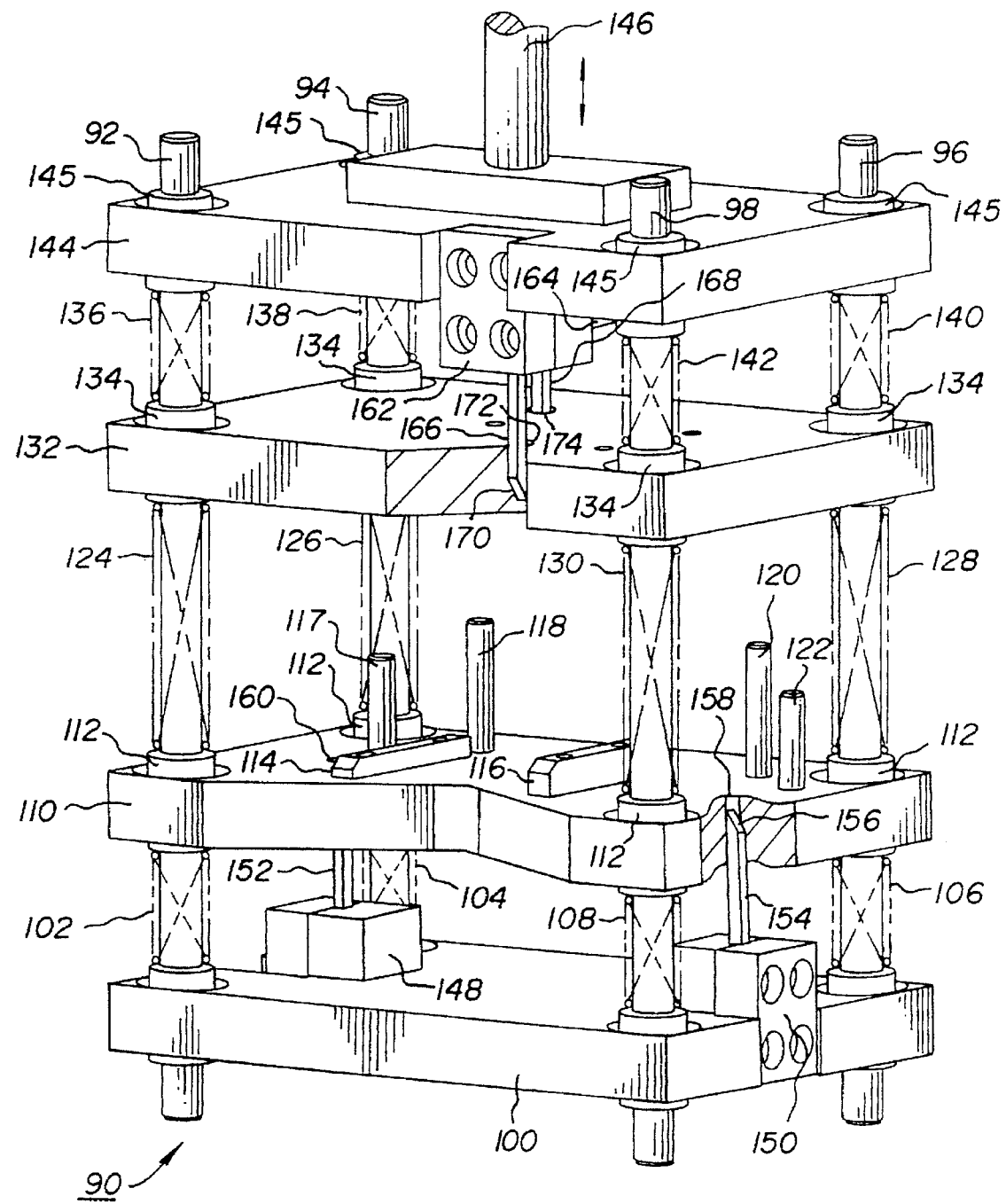
FIG. 2 shows a partially broken-away, perspective view of one embodiment of the apparatus of the invention.

Mounted near front and back ends of top plate 144 are tool support blocks 162, 164 on which are mounted downwardly extended cutting tools 166, 168. As illustrated, the tools are provided with sharpened chisel ends 170 configured for slipping between lips 66 and recesses 58, to cut the weld between hooks 54, 56 and catch tabs 60, 62. Alternatively, if the positions of the hooks and catch tabs are reversed or if the camera is positioned front face upward, chisel ends 170 are configured for sliding along recesses 68 to cut the weld between the hooks and catch tabs. Below tool 166, snipper plate 132 includes a bore 172 for passage of the tool into engagement with the camera. Similarly, as best seen in FIG. 2, a bore 174 is provided through snipper plate 132 below tool 168 for passage of the tool.

Figure 4:
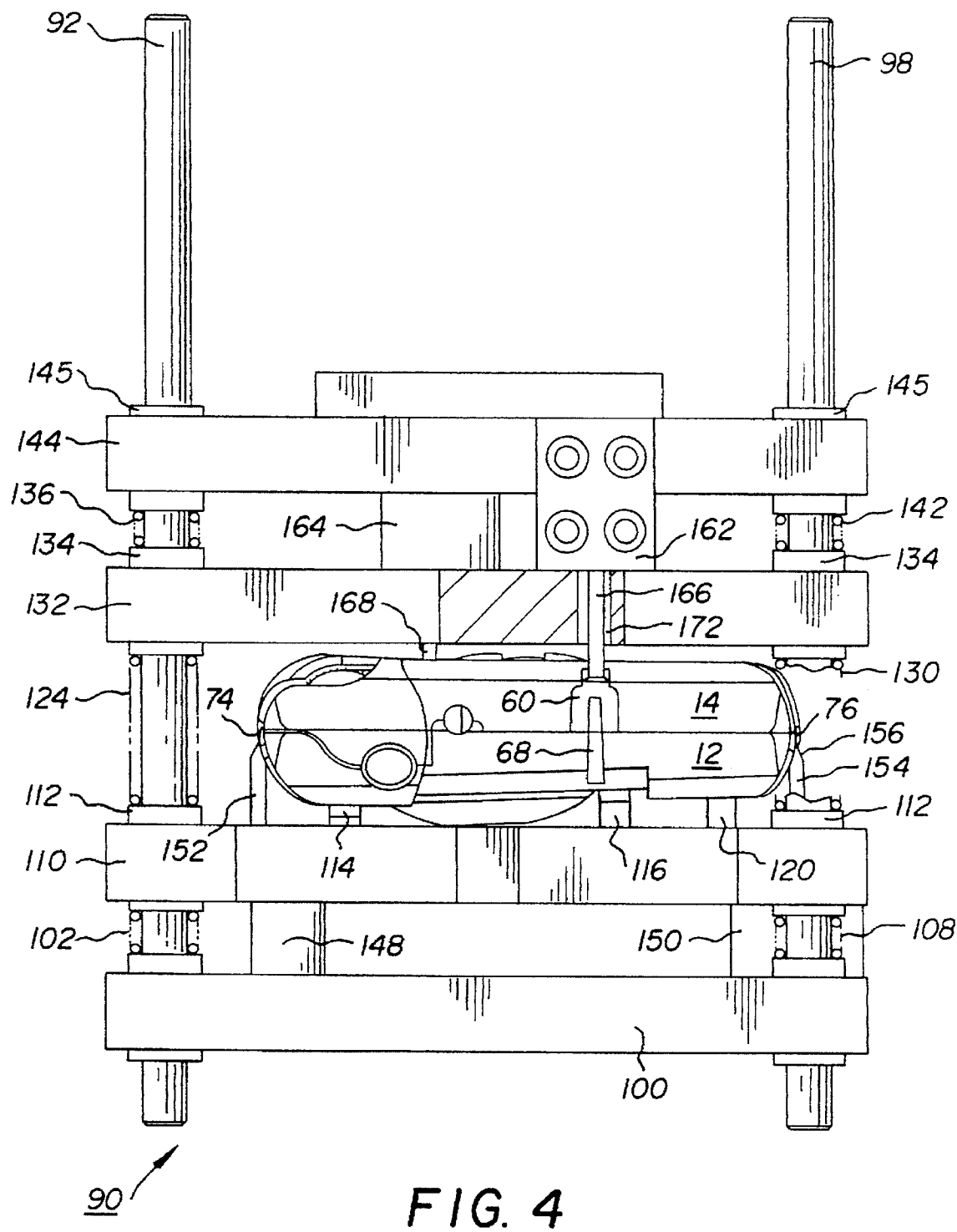
FIG. 4 shows a front view of the apparatus of FIG. 3 after actuation to engage the tools to open the fastener pairs of the camera.
Figure 5:
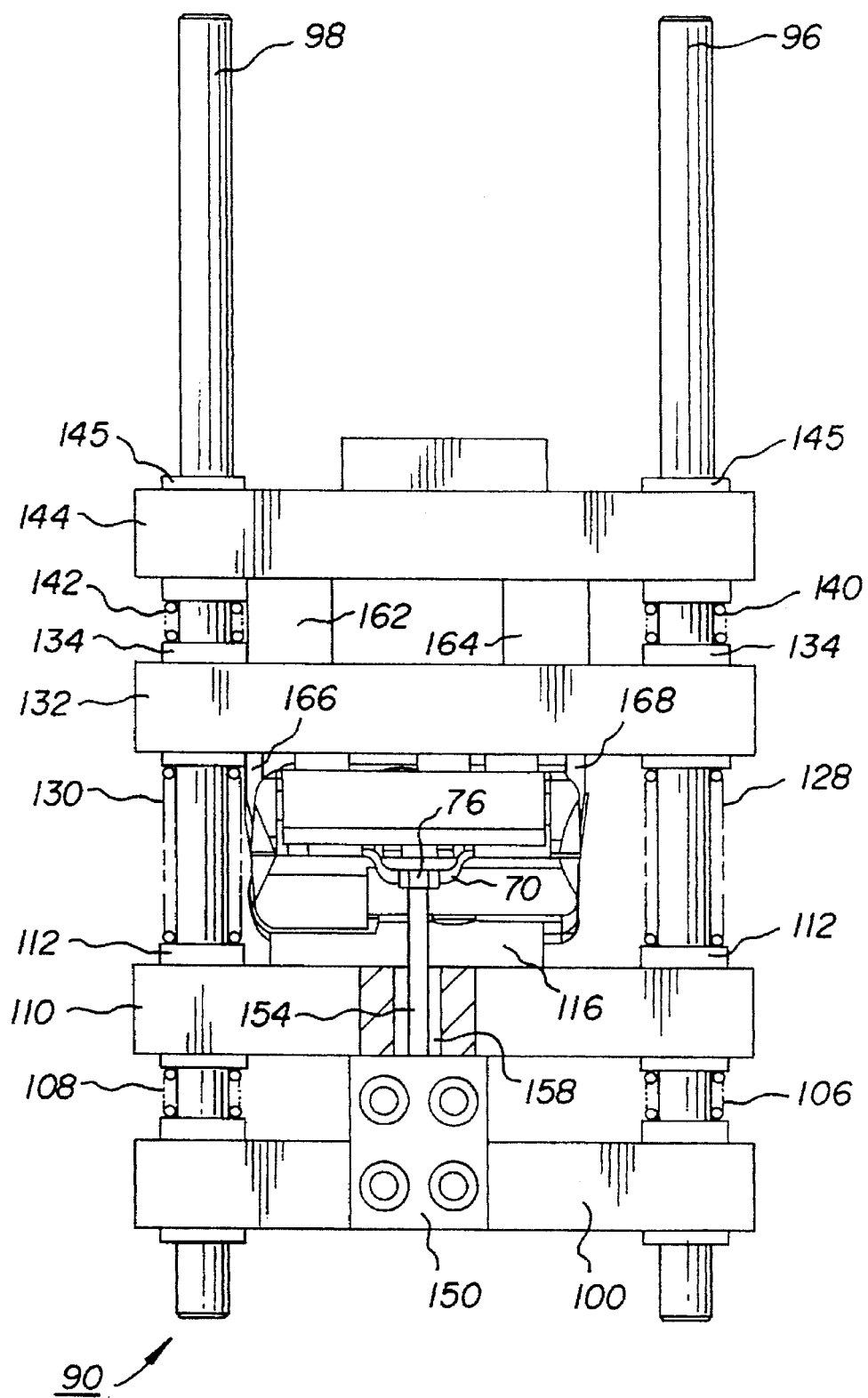
FIG. 5 shows a right end view of the apparatus of FIG. 4.

In operation of the apparatus of FIGS. 2 to 5, a camera is placed front side down on support bars 114, 116 and engaged with positioning pins 117, 118, 120, 122. Actuator rod 146 is then driven downward, compressing the sets of coil springs, until tools 152, 154 slip between catch tabs 75, 76 and recesses 70 as shown in FIG. 5; and tools 166, 168 engage the weld between hooks 54, 56 and catch tabs 60, 62 as shown in FIG. 4. Continued movement of the tools causes catch tabs 75, 76 to be prized out of engagement with catches 72, 74; and causes the weld to be broken between hooks 54, 56 and catch tabs 60, 62. Catch tabs 60, 62 are also prized aside. Thus, the four fastener pairs are released. Actuator rod 146 is driven upward and the camera is removed from the apparatus, at which time the front cover part and back cover part easily may be separate from the internal components of the camera.

Figure 6:
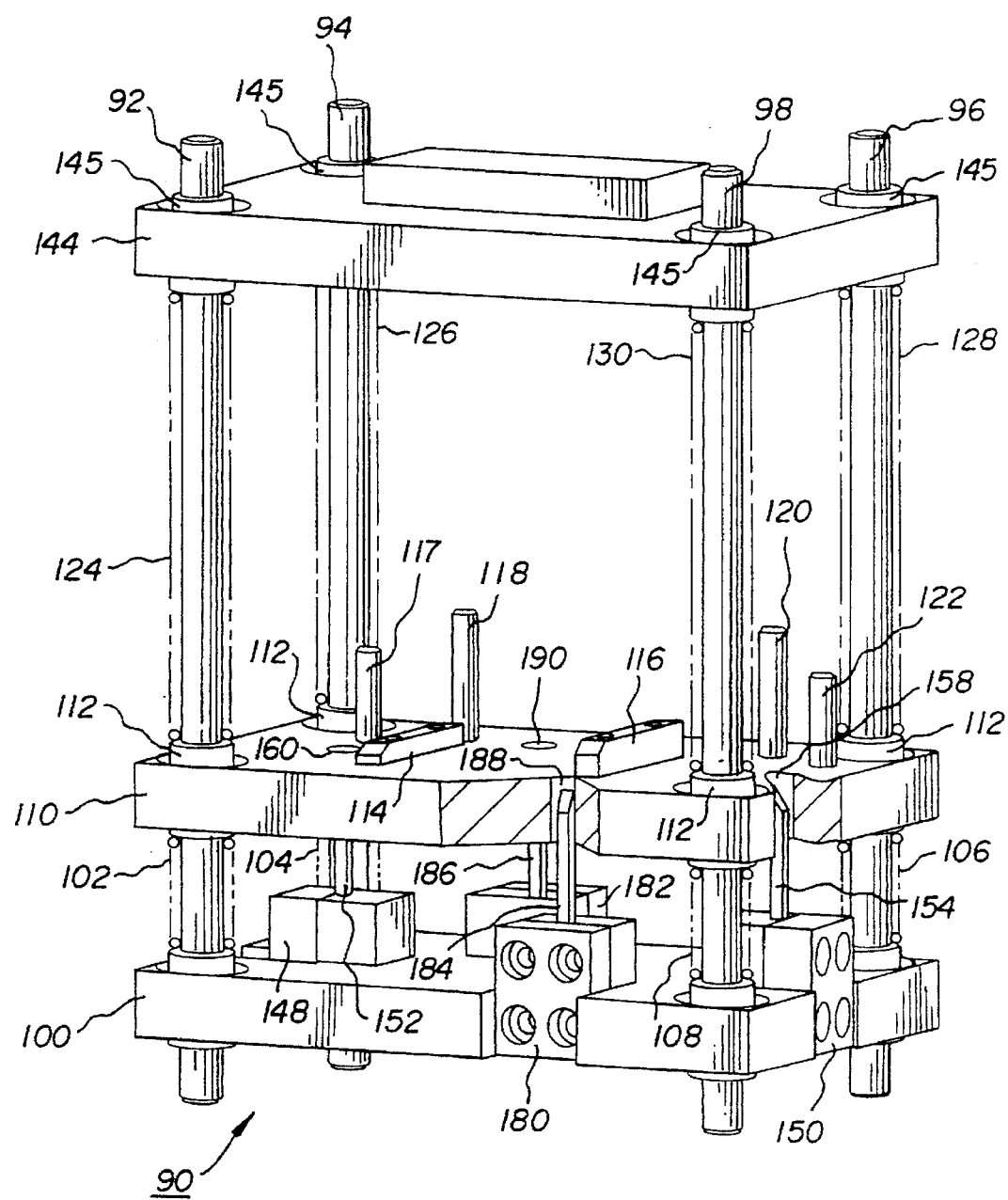
FIG. 6 shows a partially broken-away, perspective view of another embodiment of the apparatus of the invention.

FIG. 6 shows an alternative embodiment of the invention in which all of the tools are located on base plate 100. This arrangement can be used to open a camera positioned face down as in FIG. 3. All of the tools alternatively could be located on top plate 114; however, the camera would then have to be positioned face up. In the embodiment of FIG. 6, Stripper plate 132 has been omitted as unnecessary. A pair of tool support blocks 180, 182 are mounted near front and back ends of base plate 100. A pair of upwardly extended cutting tools 184, 186, similar to tools 166, 168, are supported by blocks 180, 182. Above tool 184, stripper plate 110 includes a bore 188 for passage of the tool into engagement with the camera. Similarly, a bore 190 is provided through stripper plate 110 above tool 186 for passage of the tool.

In operation of the embodiment of FIG. 6, a camera is engaged with the support bars and alignment pins. Top plate 144 is then driven downwardly, compressing the sets of coil springs until tools 152, 154 slip between catch tabs 75, 76 and recesses 70; and tools 186, 188 slip along recesses 68 to engage the weld between hooks 54, 56 and catch tabs 60, 62. Continued movement of the tools causes catch tabs 75, 76 to be prized out of engagement with catches 72, 74; and causes the weld to be broken between hooks 54, 56 and catch tabs 60, 62. Catch tabs 60, 62 are also prized aside. Thus, the four fastener pairs are released. Actuator rod 146 is driven upward and the camera is removed from the apparatus, at which time the front cover part and back cover part easily may be separate from the internal components of the camera.

| Parts List | |
|---|---|
| 10...camera housing | 24$_f$, 24$_b$...opening for shutter trigger button |
| 12...front cover part | |
| 14...back cover part | 26$_f$, 26$_b$...opening for viewing window for counterwheel |
| 16...opening for taking lens | |
| 18...opening for viewfinder | 28, 30, 32...positioning pins |
| 20...opening for flash unit | 34...top wall of 12 |
| 22...integral flash activation button | 36...bottom wall of 12 |
| | 38...left end wall of 12 |
| 40...right end wall of 12 | 117, 118, 120, 122...camera alignment pins |
| 42...top wall of 14 | |
| 44...bottom wall of 14 | 124, 126, 128, 130...coil springs |
| 46...left end wall of 14 | 132...movable stripper plate |
| 48...right end wall of 14 | 134...linear bearing |
| 50...opening in 42 | 136, 138, 140, 142...coil springs |
| 52...opening in 44 | 144...movable top plate |
| 54, 56...flexible fastener hooks | 145...linear bearing |
| 58...recess in 42 behind 54 | 146...linear actuator rod |
| 60, 62...flexible catch tabs | 148, 150...tool support blocks |
| 64...opening to receive 54, 56 | 152, 154...upwardly extended prying tools |
| 66...lip to fit into 58 | |
| 68...elongated recess in 34 in front of 64 | 156...wedge shaped end on 152, 154 |
| 70...recess in 40 | 158...bore in 110 for 154 |
| 72, 74...catches | 160...bore in 110 for 152 |
| 75, 76...flexible catch tabs | 162, 164...tool support blocks |
| 77, 78...opening to receive 72, 74 | 166, 168...downwardly extended cutting tools |
| 80, 82...tapered lips on 75, 76 | 170...sharpened chisel end on 166, 168 |
| 90...apparatus according to invention | |
| 92, 94, 96, 98...parallel guide rods | 172...bore in 132 for 166 |
| | 174...bore in 132 for 168 |
| 100...fixed base plate | 180, 182...tool support blocks |
| 102, 104, 106, 108...coil springs | 184, 186...upwardly extended cutting tools |
| 110...movable stripper plate | 188...bore in 110 for 184 |
| 112...linear bearing | 190...bore in 110 for 186 |
| 114, 116...camera support bars | |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A method of opening a camera of a type including a housing for internal camera components, the housing including a cover part and another part, each of said cover part and said other part having a top wall and a bottom wall and first and second opposite end walls; a first cooperating fastener pair extending between said top walls; a second cooperating fastener pair extending between said bottom walls; a third cooperating fastener pair extending between said first end walls; and a fourth cooperating fastener pair extending between said second end walls, said method comprising steps of:

securing said camera in a fixture;

engaging said fastener pairs with tools for releasing said fastener pairs, at least a portion of said tools being cutting chisels and at least a portion of said tools being prying tools;

moving said tools to cause said fastener pairs to release, said cutting chisels moving from back to front of said camera and causing at least a portion of said fastener pairs to be cut open, and said prying tools moving from front to back of said camera and causing at least a portion of said fastener pairs to be prized open; and separating said cover part and said other part from said camera to permit removal of reusable internal camera components.

2. A method of opening a camera of a type including a housing for internal camera components, the housing including a front cover part and a back cover part, each of said front cover part and said back cover part having a top wall and a bottom wall and first and second opposite end walls; a first cooperating fastener pair extending between said top walls; a second cooperating fastener pair extending between said bottom walls; a third cooperating fastener pair extending between said first end walls; and a fourth cooperating fastener pair extending between said second end walls, said method comprising steps of:

securing said camera in a fixture;

engaging said fastener pairs with tools for releasing said fastener pairs, some of said tools being cutting tools to cut open said first and second fastener pairs and others of said tools being prying tools to prize open said third and fourth fastener pairs;

moving said tools to cause said fastener pairs to release; and separating said cover part and said other part from said camera to permit removal of reusable internal camera components.

3. A method according to claim 2, wherein said cutting tools are chisels.

4. A method according to claim 2, wherein said tools move from front to back of said camera.

5. A method according to claim 2, wherein said tools move from back to front of said camera.

6. A method according to claim 2, wherein said prying tools move from front to back of said camera; and said cutting tools move from back to front of said camera.

7. A method according to claim 2, wherein a portion of said tools move from front to back; and a portion of said tools move back to front of said camera.

8. A method according to claim 2, wherein said tools are moved simultaneously.

9. Apparatus for opening a camera of a type including a housing for internal camera components, the housing including a cover part and another part, each of said cover part and said other part having a top wall and a bottom wall and first and second opposite end walls; and a plurality of fastener pairs extending between said parts, said apparatus comprising:

a frame;

a fixture supported on said frame for securing said camera during opening;

tool means for releasing said fastener pairs, at least a portion of said tools being cutting tools to cut open at least a portion of said fastener pairs and at least a portion of said tools being prying tools to prize open at least a portion of said fastener pairs; and means for bringing said tool means into engagement with said fastener pairs to cause said fastener pairs to release, said prying tools moving from front to back of said camera and said cutting tools moving from back to front of said camera, whereby said cover part and said other part can be separated to permit removal of reusable internal components.

10. Apparatus for opening a camera of a type including a housing for internal camera components, the housing including front cover part and a back cover part, each of said cover part and said other part having a top wall and a bottom wall and first and second opposite end walls, a first cooperating fastener pair extending between said top walls; a second cooperating fastener pair extending between said bottom walls; a third cooperating fastener pair extending between said first end walls; and a fourth cooperating fastener pair extending between said second end walls, said apparatus comprising:

a frame;

a fixture supported on said frame for securing said camera during opening;

tool means for releasing said fastener pairs, at least a portion of said tools being cutting tools to cut open said first and second fastener pairs and at least a portion of said tools being prying tools to prize open said third and fourth fastener pairs; and means for bringing said tool means into engagement with said fastener pairs to cause said fastener pairs to release, whereby said cover part and said other part can be separated to permit removal of reusable internal camera components.

11. Apparatus according to claim 10, wherein said cutting tools are chisels.

12. Apparatus according to claim 10, wherein said tools move from front to back of said camera.

13. Apparatus according to claim 10, wherein said cutting chisels and prying tools move from back to front of said camera.

14. Apparatus according to claim 10, wherein said prying tools move from front to back of said camera; and said cutting chisels move from back to front of said camera.

15. Apparatus according to claim 10, wherein a portion of said tool means move from front to back; and a portion of said tool means move back to front of said camera.

16. Apparatus according to claim 10, wherein said cutting chisels and prying tools are moved simultaneously.

17. Apparatus for opening a camera of a type including a housing for internal camera components, the housing including a cover part and another part, each of said cover part and said other part having a top wall and a bottom wall and first and second opposite end walls; and a plurality of fastener pairs extending between said parts, said apparatus comprising:

a frame including a plurality of parallel guides;

a first plate mounted for movement on said guides;

a fixture supported on said first plate for securing said camera during opening;

a second plate mounted on said guides;

tool means for releasing said fastener pairs, at least a portion of said tool means being mounted on said second plate; and means for bringing said tool means into engagement with said fastener pairs to cause said fastener pairs to release, said means for bringing causing said first plate to move toward said portion of said tool means, whereby said cover part and said other part can be separated to permit removal of reusable internal camera components.

18. Apparatus according to claim 17, further comprising a third plate mounted on said guides, at least a portion of said tool means being mounted on said third plate; and said means for bringing into engagement causes said third plate to move toward said first and second plates.

19. Apparatus according to claim 17, wherein said second plate is fixedly mounted on said guides.

20. Apparatus according to claim 18, further comprising resilient means for biasing said first, second and third plates apart.

* * * * *